July 19, 1955 J. E. O'HERRON 2,713,185
RESILIENT FASTENER FOR TAPERED MOLDINGS
Filed March 1, 1952
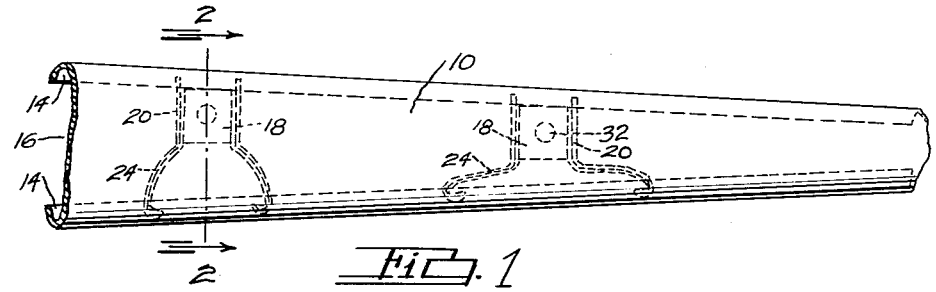
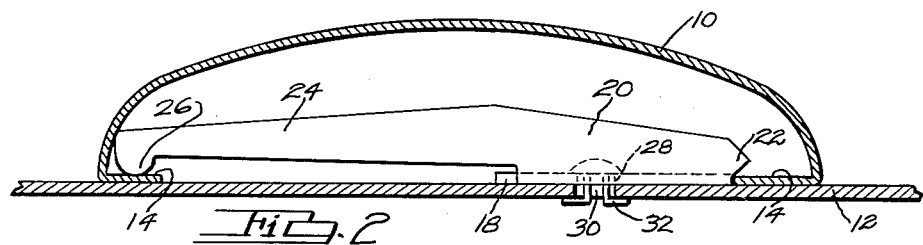
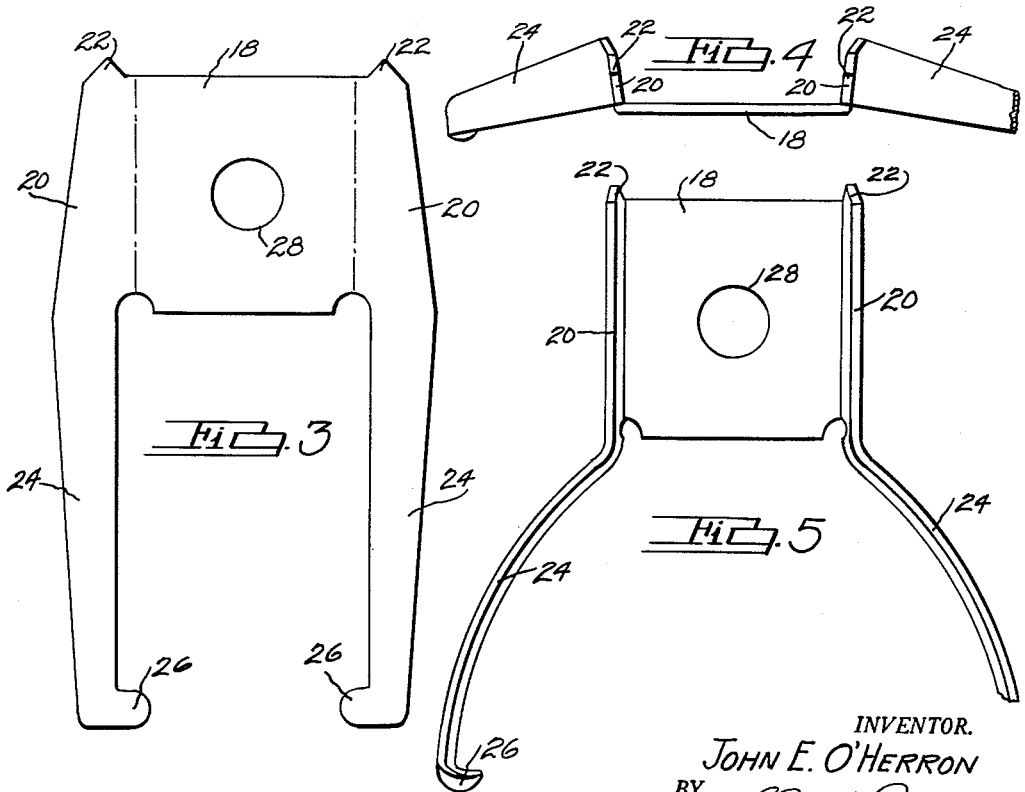
INVENTOR.
JOHN E. O'HERRON
BY
HIS ATTORNEY United States Patent Office 2,713,185
Patented July 19, 1955

2,713,185

RESILIENT FASTENER FOR TAPERED MOLDINGS

John E. O'Herron, Roseville, Mich.

Application March 1, 1952, Serial No. 274,343

1 Claim. (Cl. 24—73)

This invention relates to a fastener and more particularly to a fastener for use in securing a part to a panel wherein the fastener is concealed as when used for securing a channel shaped metal molding to a panel.

The molding strip herein illustrated, is of the inverted channel type having inwardly extended flanges resting against the outer surface of a panel to which the molding is applied, and the molding is longitudinally tapered.

It is an object of the present invention to provide a single piece fastener which is resiliently yieldable by the pressure of the channel, so that the width of the fastener is varied for engagement with the opposite side flanges of the molding at any position throughout the length of the variable width of the molding.

Another object of the invention is to provide a fastener which will permit the molding to be hooked over one end of the fastener and then pressed into resilient engagement with the other end of the fastener against the spring tension of the fastener.

Other objects and advantages of the invention will more fully appear from the following description taken in connection with the accompanying drawings in which;

Fig. 1 is a top plan view of a portion of a tapered molding applied to a panel, the improved fasteners being shown in dotted lines;

Fig. 2 is an enlarged cross sectional view taken on line 2—2 of Fig. 1, showing the fastener in side elevation;

Fig. 3 is a top plan view of a sheet metal blank from which the fastener is formed, the dot and dash lines indicating the location of bending;

Fig. 4 is an end view of the formed fastener; and

Fig. 5 is a top plan view of the fastener.

Referring to the drawings, I have shown a tapered molding 10, applied to a supporting panel 12. The molding strip herein illustrated is a hollow channel shaped member having inwardly extending flanges 14 defining a slot 16 between them.

The fastener is formed from sheet metal, preferably of spring steel. A blank is stamped from the sheet metal, bent along the dot and dash lines in Fig. 3 and formed to the finished shape, shown in Figs. 2, 4 and 5.

The finished fastener is provided with a base portion 18 having lateral flanges 20 bent outwardly from the base portion 18 forming a channel member, the angle of the flanges with the base forming an obtuse angle.

One end of each flange 20 is provided with a V-shaped projection 22 extending beyond the edge of the base portion 18. This projection is for receiving the inner edge of one of the flanges 14 of the molding 10. The opposite ends of the flanges 20 are extended beyond the opposite edge of the base 18 and are tapered forming resilient arms 24. The outer free ends of arms 24 have inwardly extending flanges 26 which are dished to provide arcuate contact surfaces as illustrated in Figs. 2, 4 and 5.

The arms 24 are resilient and are normally in a position parallel to that portion of the flanges 20 adjacent the sides of the body portion 18, but may be sprung outwardly with respect to each other and inwardly toward the body portion 18, as illustrated in Figs. 4 and 5.

The flanges 20 and extension arms 24 are at an obtuse angle with the plane of the body portion 18 so that as the arms 24 are sprung outwardly away from each other, the outer free ends thereof are moved downwardly, causing a resilient pressure to be applied to the flanges 14 when the parts are assembled.

The body portion 18 is shown provided with an aperture 28 which, for assembly, is aligned with an aperture 30 in the panel 12 and a securing device 32, such as a rivet, screw, bolt or the like, rigidly secures the body portion 18 of the fastener to the panel 12.

To assemble the molding 10 to the panel 12, the fastener is attached to the panel 12 and one flange 14 of the molding 10 is slid under the arcuate tip end 26 of the arms 24 and the molding is forced laterally, against the spring tension of the arms 24, until the opposite flange 14 of the molding slides over the V projection 22. The spring pressure of the arms urges the molding in the opposite direction from which it was forced. The last named flange 14 is urged into close association with the panel 12 by the under tapered surface of the V and the other flange 14 is held against the panel by the spring arms 24.

It will be understood that since the arms 24 are movable inwardly toward the fastener body, the same size and shape fastener may be used throughout the length of a tapered or irregularly shaped molding.

It will be apparent that the fastener may be positioned at varying distances on the panel, depending upon the size, shape and proportions of the supported molding member. The size and shape of the fastener may be varied to suit different conditions of the parts to be secured together and it is not my intention to limit the scope of the invention other than by the terms of the appended claim.

I claim:

A spring sheet metal fastener for use with channel-shaped members, as for example tapered molding strips having inturned flanges, comprising a body portion insertable between the opposed inturned flanges of the molding and adapted to be secured to a supporting panel, and flanges at opposite side edges of said body portion bent upwardly out of the plane of said body portion, the angle between each of said flanges and the upper face of the body portion being obtuse, one end of each flange projecting beyond an end edge of the body portion so as to engage one of the molding flanges, the opposite end of each flange projecting outwardly beyond the opposite edge of the body portion, the outer ends of said last named projecting ends being spaced apart a distance greater than is the distance between said flanges in the region of said body portion and normally below said body portion, whereby when said fastener is assembled in the tapered molding said last named flange projecting ends engage the other of said molding flanges and are resiliently deflected into the plane of the body portion and inwardly toward said body portion to adjust to variations in width of the molding flanges.

References Cited in the file of this patent

UNITED STATES PATENTS

| | | |
|---|---|---|
| 2,133,837 | Wiley | Oct. 18, 1938 |
| 2,154,711 | Van Uum | Apr. 18, 1939 |
| 2,184,255 | Kral | Dec. 19, 1939 |
| 2,214,150 | Van Uum | Sept. 10, 1940 |
| 2,249,902 | Kral | July 22, 1941 |
| 2,295,449 | Churchill | Sept. 8, 1942 |
| 2,298,901 | Pickering | Oct. 31, 1942 |
| 2,515,895 | Poupitch | July 18, 1950 |
| 2,626,772 | Flora | Jan. 27, 1953 |